United States Patent
Burge et al.

(10) Patent No.: US 6,276,896 B1
(45) Date of Patent: Aug. 21, 2001

(54) APPARATUS AND METHOD FOR COOLING AXI-CENTRIFUGAL IMPELLER

(76) Inventors: Joseph C. Burge, 1 Rabbits Run, Palm Beach Gardens, FL (US) 33418; Norman Paul Poire, 7000 N. 16th St. #120-242, Phoenix, AZ (US) 85020

( * ) Notice: Subject to any disclaimer, the term of this patent is extended or adjusted under 35 U.S.C. 154(b) by 0 days.

(21) Appl. No.: 09/626,289

(22) Filed: Jul. 25, 2000

(51) Int. Cl.[7] .................................. F01D 5/08; F02C 7/12
(52) U.S. Cl. .......................... 415/115; 416/95; 415/178; 415/116
(58) Field of Search .................... 416/95, 96 R, 416/97 R; 415/1, 115, 116, 177, 174.5, 178

(56) References Cited

U.S. PATENT DOCUMENTS

| | | |
|---|---|---|
| 3,490,852 | 1/1970 | Carlstrom et al. . |
| 3,572,996 | 3/1971 | Borden . |
| 3,635,586 | 1/1972 | Kent et al. ............... 416/95 |
| 3,644,058 | 2/1972 | Barnabei et al. . |
| 3,647,313 * | 3/1972 | Koff ....................... 415/115 |
| 3,748,060 | 7/1973 | Hugoson . |
| 3,814,539 | 6/1974 | Klompas ................. 416/95 |
| 3,989,410 | 11/1976 | Ferrari . |
| 4,277,222 * | 7/1981 | Barbeau ................. 416/95 |
| 4,674,955 | 6/1987 | Howe et al. ............. 416/95 |
| 4,759,688 | 7/1988 | Wright et al. ........... 416/95 |
| 4,793,772 | 12/1988 | Zaehring et al. ........ 416/95 |
| 4,820,116 | 4/1989 | Hovan et al. ............ 415/115 |
| 4,854,821 | 8/1989 | Kernon et al. . |
| 4,920,741 | 5/1990 | Liebl ...................... 415/115 |
| 4,923,370 * | 5/1990 | Larson et al. ........... 415/115 |
| 4,961,309 | 10/1990 | Liebl ...................... 415/115 |
| 5,143,512 | 9/1992 | Corsmeier et al. ...... 415/115 |
| 5,173,024 | 12/1992 | Mouchel et al. ........ 416/95 |
| 5,310,319 | 5/1994 | Grant et al. ............. 416/95 |
| 5,555,721 * | 9/1996 | Bourneuf et al. ....... 415/115 |
| 5,816,779 | 10/1998 | Chambon et al. ....... 415/178 |
| 5,984,636 | 11/1999 | Fähndrich et al. ...... 415/178 |

* cited by examiner

Primary Examiner—F. Daniel Lopez
Assistant Examiner—Richard Woo
(74) Attorney, Agent, or Firm—Dowrey & Associates

(57) ABSTRACT

An apparatus and method for cooling an impeller for an axi-centrifugal compressor of a gas turbine engine. A curvic coupling joint is used between the aft end of the impeller and the turbine shaft. A generally annular disk-shaped shield structure is attached to the aft face of the impeller and extends from the impeller rim to the turbine shaft just aft of the curvic coupling. The shield structure is offset from the aft face of the impeller thereby forming a cavity therebetween. The shield structure has a plurality of circumferentially space apertures through which cooling air passes to first circulate through the cavity by means of radial vanes to cool the impeller, then exit through the curvic coupling joint. The cooling air is then directed afterward along the turbine shaft to be used to cool high-pressure turbine blades.

28 Claims, 4 Drawing Sheets

APPARATUS AND METHOD FOR COOLING AXI-CENTRIFUGAL IMPELLER

BACKGROUND OF THE INVENTION

1. Field of the Invention

The present invention relates, generally, to gas turbine engines. More particularly, the invention relates to the impeller of an axi-centrifugal compressor for gas turbine engines for aircraft. The invention has particular utility for improving the efficiency of a gas turbine engine by allowing a higher compressor discharge temperature.

2. Background Information

Though it does not depict any existing engine, FIG. 1 illustrates the current state-of-the-art for axi-centrifugal gas turbine aircraft engines, and is included to provide a frame of reference for the subsequent discussion of prior art and for the present invention. The direction is to the left in the figure, and aft is to the right. Axi-centrifugal gas turbine engines are very compact and efficient. The main airflow goes through a series of axial compressor stages 10 then through the impeller 12 which has a plurality of blades 14 which redirect the flow radially with centrifugal force into diffuser pipes 16 which increase the pressure and reduce the velocity of the airflow as it is redirected toward combustors 18. In the combustors, the air is mixed with fuel, ignited, and the resulting gas passed through blades of high-pressure turbines 20. A small portion of the main airflow, called cooling air bleed, is removed from the main airflow in front of impeller 12 and is directed afterward along the hub of the impeller to the high-pressure turbines 20 where it used to cool the blades 21 of the second stage high-pressure turbine before reentering the main airflow stream.

Referring also to FIG. 2, the impeller 12 is almost always made of titanium rather than steel due to titanium's higher strength to density ratio, which makes it ideal for rotating machinery components. Furthermore, titanium is much less expensive to purchase and machine than high strength steels. However, at sustained temperatures above 1000° F., the strength of titanium diminishes rapidly with increasing temperature. With current titanium impellers, such as is illustrated in FIG. 2, the maximum compressor discharge temperature, usually identified by the symbol T3, is limited to 1100° F.

The impeller temperatures are non-uniform. The peak temperature occurs near the rim 24 on the back face 22 at point 26 where radiant heat from the turbines 20 is reflected forward. Also, there is leakage of the hot main airflow around rim 24 onto the back face 22 of impeller 12, further exacerbating the heating of back face 22. The temperature at point 26 is approximately 150° F. higher than anywhere else on impeller 12 at the high-power engine conditions. If, at those conditions, the temperature of the impeller at point 26 could be reduced 150° F., that would allow the compressor discharge temperature T3 to be increased by 150° F. to 1250° F., thereby significantly increasing the overall engine efficiency.

The temperature at point 26 cannot be reduced simply by blowing cooling air at the back face 22 near rim 24 because the main airflow crosses a gap between the rim 24 and the diffuser pipes 16. The flow parameters across this gap are critical. Any cooling air directed at the back face 22 near rim 24 of impeller 12 would impinge on the main airflow and disrupt that critical flow sufficiently to destroy the effectiveness of the airflow into and through the diffuser pipes 16, resulting in a drastic reduction of engine efficiency.

U.S. Pat. No. 4,793,772 to Zaehring and U.S. Pat. Nos. 4,920,741 and 4,961,309, both to Liebl, disclose circulating cooling air in a chamber formed outside of the stub shaft to cool the last compressor section of an axial compressor. U.S. Pat. No. 4,808,073 to Zaehring et al. discloses vane-like ribs on the inside of the rear stub shaft which direct cooling air from the center shaft outwardly along the stub shaft and against the outer portion of the last rotor disk. These devices and methods work because the stub shaft connects to the last stage compressor rotor near the rim of the rotor. The shaft that connects to an impeller of an axi-centrifugal compressor connects near its hub rather than its rim, therefore, these devices and methods are not applicable to an impeller for an axi-centrifugal compressor.

The present invention provides an improved impeller for an axi-centrifugal gas turbine and a method of cooling it which reduces the temperature near the outer rim 150° F. over conventional impellers without disrupting the critical airflow between the impeller and the diffuser pipes.

BRIEF SUMMARY OF THE INVENTION

The present invention provides an apparatus and method for cooling an impeller for an axi-centrifugal compressor of a gas turbine engine. A curvic coupling joint is used between the aft end of the impeller and the turbine shaft. A generally annular disk-shaped shield structure is attached to the aft face of the impeller and extends from the impeller rim to the turbine shaft just aft of the curvic coupling. The shield structure is offset from the aft face of the impeller thereby forming a cavity therebetween. The shield structure has a plurality of circumferentially spaced apertures through which cooling air passes to first circulate through the cavity by means of radial vanes to cool the impeller, then exit through the curvic coupling joint. The cooling air is then directed afterward along the turbine shaft to be used to cool high-pressure turbine blades.

The shield structure has a shield portion generally parallel to the flat portion of the aft face of the impeller, and a plenum portion located radially inward from the shield portion. The shield portion and the plenum portion may be made as one unit or two separate components, preferably with a radial overlap between the components. The apertures are located near the juncture of the shield portion and plenum portion.

A plurality of radial vanes extend forward from the shield portion to the flat portion of the aft face of the impeller. The radial vanes are arranged in pairs straddling each aperture with each pair of vanes being joined together at their inner ends by a joining portion to form a U-shape. The joining portion partially surrounding the aperture. The radial vanes have outer ends that terminate radially inward from the rim of the shield structure to allow cooling air to flow around them.

The plenum portion has an inner rim with an aft surface which mates with an axial piloting ring disposed circumferentially on the turbine shaft and located just aft of the curvic coupling. The plenum ring has radial vanes extending forward and inward to aid inward airflow.

Cooling air is extracted from the main airflow at the diffuser exit and routed selectively through a heat exchanger or a bypass of the heat exchanger. At least a portion of the cooling air is injected through the apertures, into the cavity between the shield plate and the aft face of the impeller. It circulates radially outward along the vanes on the shield plate then around the ends of the vanes and radially inward to the cavity between the plenum ring and the aft face of the impeller, then inward through the curvic coupling and on back to the turbines.

DETAILED DESCRIPTION

Figure 2:
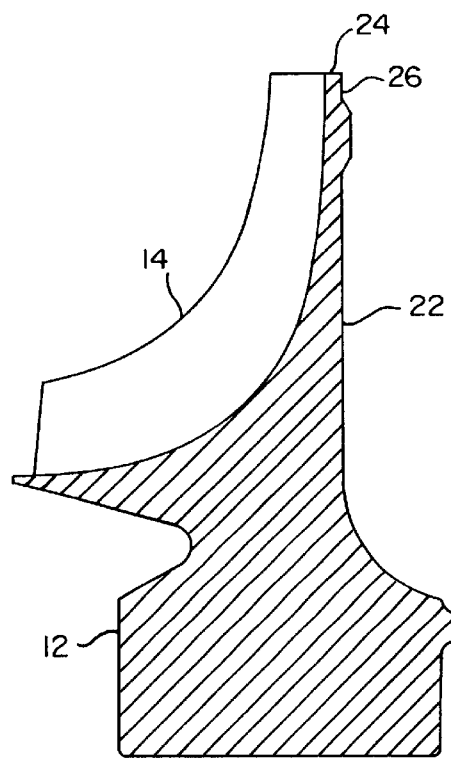
FIG. 2 is a partial cross-sectional view of the impeller of the gas turbine engine illustrated in FIG. 1.
Figure 3:
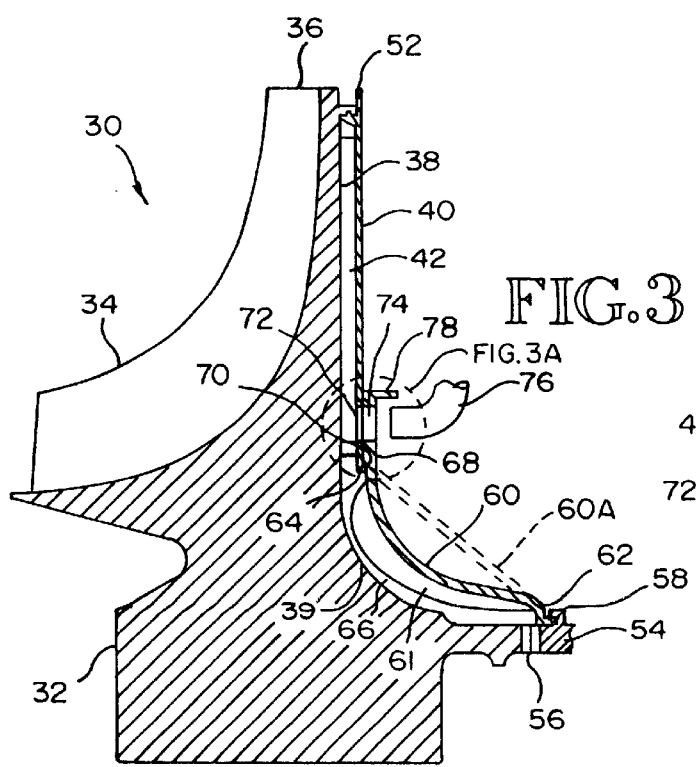
FIG. 3 is a partial cross-section of an improved impeller of the present invention.

Referring to FIG. 3, an example of the preferred embodiment of the present invention is illustrated and generally indicated by the reference numeral 30. The improved impeller 30 has an impeller body 32 with blades 34 on the front, a rim 36 and a back face with a generally flat portion 38 and a curved portion 39 much like the prior art impeller 12 illustrated in FIG. 2. A shield plate 40, preferably made of titanium, is attached to and offset from the back face flat portion 38 and has a plurality of integral radial vanes 42 that contact the back face thereby forming a plurality of cavities through which cooling air is circulated, as will be described below, to cool the back face of the impeller body 32 thereby reducing the temperature near the rim 36 by approximately 150° F., and also reducing the impeller thermal stress gradients from the front face to the back face. Shield plate 40 preferably has a thermal barrier coating, such as ceramic, on its aft face to reduce heat transfer across shield plate 40.

Figure 4:
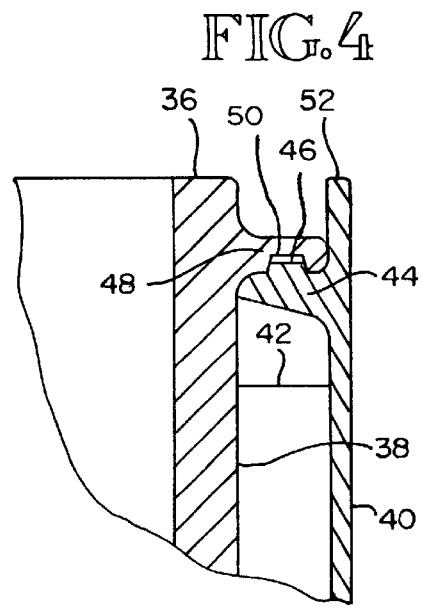
FIG. 4 is an enlarged view of a portion of FIG. 3.

Referring also to FIG. 4, shield plate 40 generally has an annular disk shape with an outer rim and an inner rim. Near the outer rim of shield plate 40 is a circumferential rail 44 extending forward which has an integral radial step 46 extending outward around circumferential rail 44. Near the rim 36 of the impeller body 32 is mating ring 48 which extends aftward from back face flat portion 38 and is preferably disposed radially outward from and adjacent to circumferential rail 44. Mating ring 48 has a recess 50 which receives radial step 46 of circumferential rail 44. Because of the high rim speeds of these components, the circumferential rail 44, radial step 46 and mating ring 48 are continuous full hoop structures with uniform axial cross sections. The high rim speeds at this radial location result in centrifugal forces that would cause any lug or other discontinuous portion of these components to exceed the tensile strength of the material locally.

To install shield plate 40 on impeller body 32, the impeller body 32 is heated and shield plate 40 is cooled sufficiently to allow the mating ring 48 to pass over radial step 46. As the impeller body 32 cools and shield plate 40 warms, radial step 46 engages recess 50 making a mechanical joint. When the components reach room temperature, they are locked together. This mechanical joint axially retains the outer end of the shield plate against the impeller and seals against cooling air leakage through the joint. During operation, the centrifugal loads tend to make this joint close tighter. The relative radial positions of the circumferential rail and the mating ring could be reversed, but that arrangement may tend to allow the joint to open under centrifugal loads.

Shield plate 40 has circumferential ring 52 at the outer rim which is located radially outward from circumferential rail 44 and mating ring 48, and extends generally radially outward from shield plate 40. Circumferential ring 52 provides a heat shield for the local area around mating ring 48 and circumferential rail 44.

Referring again to FIG. 3, the impeller body 32 is connected to the turbine shaft 54 by a curvic coupling joint 56. The turbine shaft 54 has a piloting ring 58 just aft of the curvic coupling 56. A plenum ring 60, preferably made of titanium, is mounted on the turbine shaft 54 with its aft end 62 mated to the piloting ring 58. Piloting ring 58 preferably restrains end 62 both radially and axially. The plenum ring 60 extends radially outward and forward to a radial piloting ring 64 on the inner rim of shield plate 40, thereby creating a cavity 66 between the plenum ring 60 and the impeller body 32. The plenum ring 60 preferably follows the contour of the back face curved portion 39, but it need not do so. Alternatively, it may span straight across between axial piloting ring 58 and radial piloting ring 64, as indicated by the phantom lines 60A, but that makes cavity 66 significantly larger. Shield plate 40 and plenum ring 60 are preferably made as two separate pieces as shown for cost reasons, but they may be made as a single structure, thereby eliminating the joint between the shield plate 40 and plenum ring 60.

A plurality of radial vanes 61 extend forward from plenum ring 60 similar to vanes 42 on shield ring 40. Vanes 61 are needed to pump the cooling air inward through cavity 66. The cooling air from the radial vanes 42 of shield plate 40 is passed through cavity 66 and through the teeth of the curvic joint 56 where it is directed aftward to cool the second stage high-pressure turbine blades.

Figure 3A:
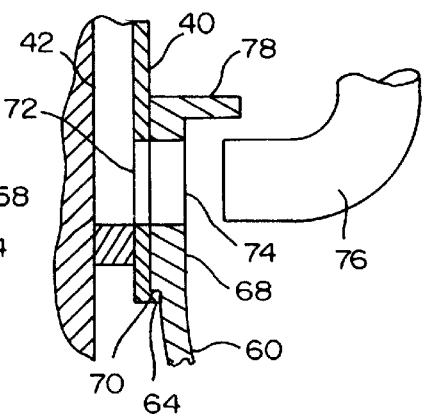
FIG. 3A is an enlarged view of a portion of FIG. 3.

Referring also to FIG. 3A, where the plenum ring 60 meets the shield plate 40, the plenum ring 60 has a mating portion 68 extending radially outward adjacent the aft face of shield plate 40 near its inner rim. A piloting surface 70 on the inner forward portion of mating portion 68 engages and mates to the radial piloting ring 64 on shield plate 40. The shield plate 40 has a plurality of circumferentially spaced apertures 72 at a uniform radius which align with apertures 74 in plenum ring 60. Clocking between shield plate 20 and plenum ring 60 is maintained by any known means, such as dowel pins, or alignment features integral with the components, to maintain alignment of apertures 72 and 74. Apertures 72 and 74 allow for passage of cooling air from tangential on-board injection (TOBI) nozzles 76 forward through plenum ring 60 and shield plate 40 into spaces between radial vanes 42. At the outer rim of the plenum ring 60 a shield ring 78 extends aftward from the outer edge of mating portion 68. The shield ring 78 shields the apertures 74 and the exit port of the TOBI nozzles 76 from the compressor discharge flow stream which leaks past the rim 36 of impeller body 32.

Pressure drop in the cooling air system is minimized by the use of the TOBI nozzles which are directed partially in the direction of impeller rotation so that air exiting the TOBI nozzles has a velocity component in the direction of impeller rotation. There are preferably a plurality of TOBI nozzles 76 circumferentially spaced around the engine. Each TOBI nozzle 76 is positioned so that its exit port is located radially inward from and adjacent to shield ring 78, and is also aligned with apertures 74 and 72. A brush seal 86 (shown in FIG. 7) extends from a stationary structure to shield plate 40 above shield ring 78. The brush seal 86 limits the cooling air from flowing radially outward instead of through the apertures 74, and also shields the cooling air from inflowing leakage of the main airflow around rim 36.

Figure 6:
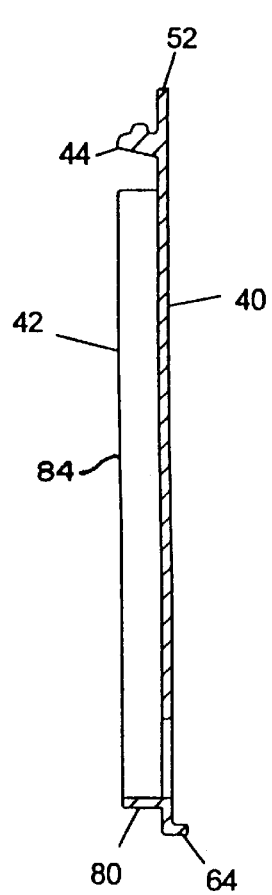
FIG. 6 is a cross-sectional view of the shield plate taken along the line 6—6 of FIG. 5.
Figure 5:
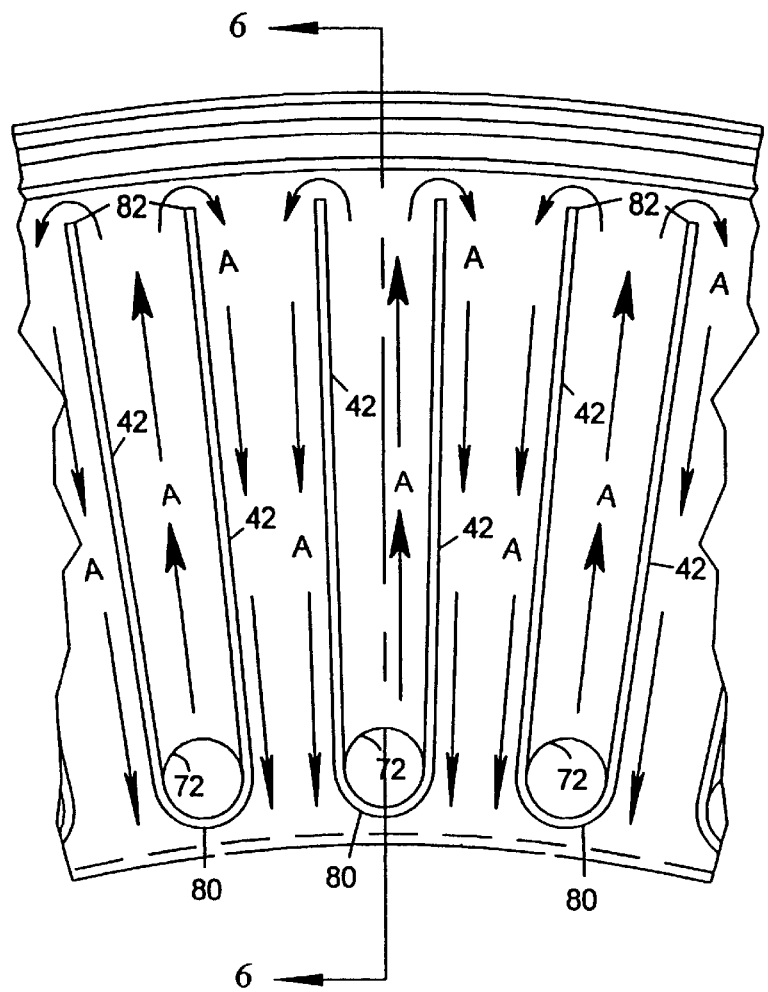
FIG. 5 is an end view of a portion of the shield plate attached to the impeller body.

Referring to FIGS. 5 and 6, the relationship between radial vanes 42 and apertures 72 is shown. Radial vanes 42 are arranged in pairs straddling each aperture. Each pair of vanes 42 has a joining portion 80 connecting their inner ends to form a U-shape. The joining portion 80 is adjacent the aperture 72 and follows the shape of it to partially surround it. In the embodiment shown in FIG. 5, apertures 72 are round and joining portion 80 is semicircular. Radial vanes 42 do not extend all the way to circumferential rail 44. Their terminal ends 82 leave a gap between the ends 82 and circumferential rail 44 which allows cooling air to flow around ends 82. When the shield plate 40 is installed on impeller body 32, the forward edge 84 of each radial vane 42 butts against the back face 38 of impeller body 32 as shown in FIG. 3. Cooling air entering apertures 72 from TOBI nozzles 76 flows radially outward from apertures 72 along the inside of each pair of radial vanes 42, then around ends 82 and radially inward between the pairs of vanes 42 as shown by arrows A. The resulting cooling is a forced-vortex, closed-circuit system, and therefore independent of the inflow leakage on the impeller back face from the main gas stream.

Figure 1:
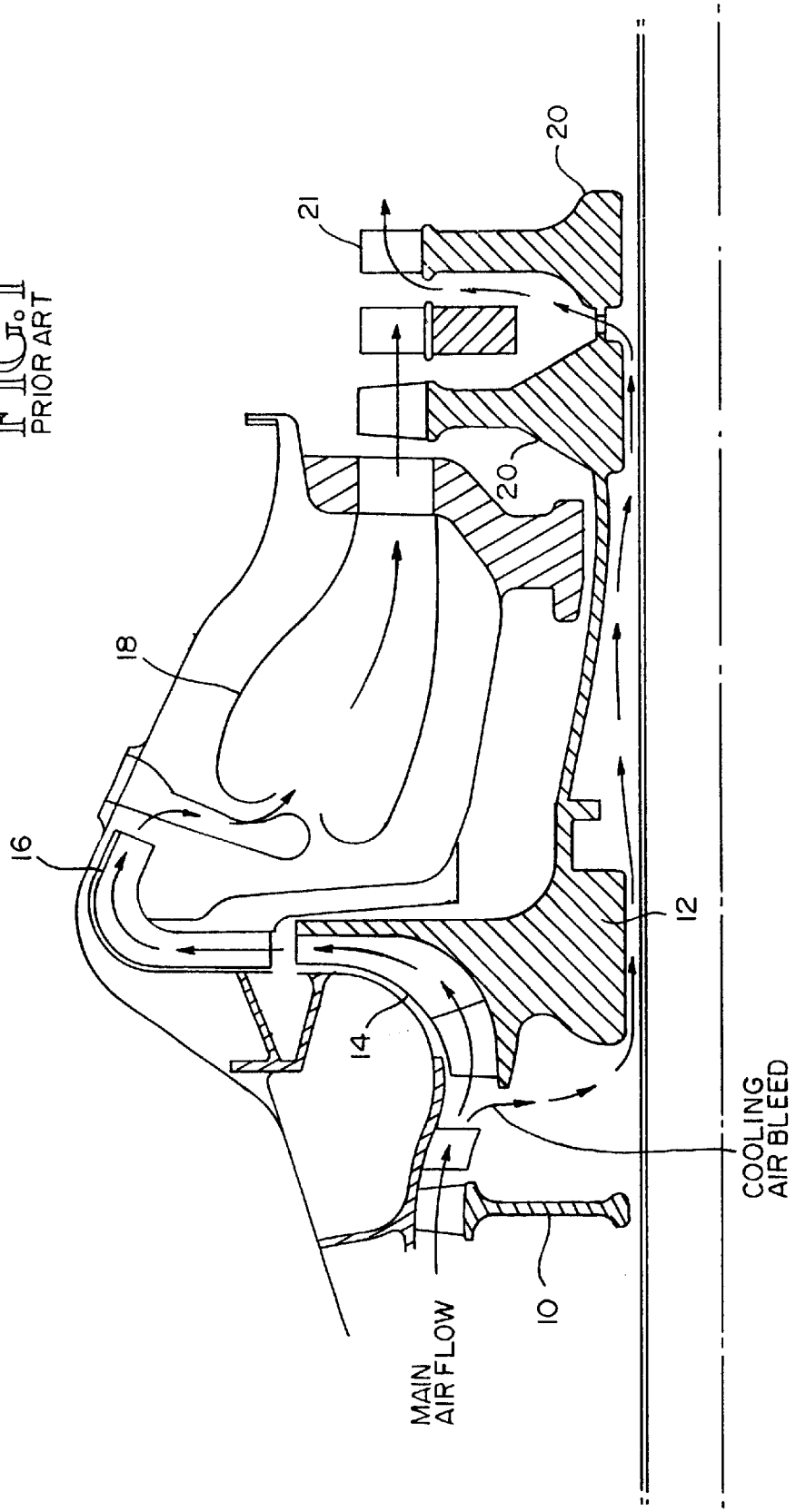
FIG. 1 is a partial, longitudinal cross-sectional view of an axi-circumferential gas turbine engine illustrative of the prior art showing the main airflow and cooling airflow paths through the components.
Figure 7:
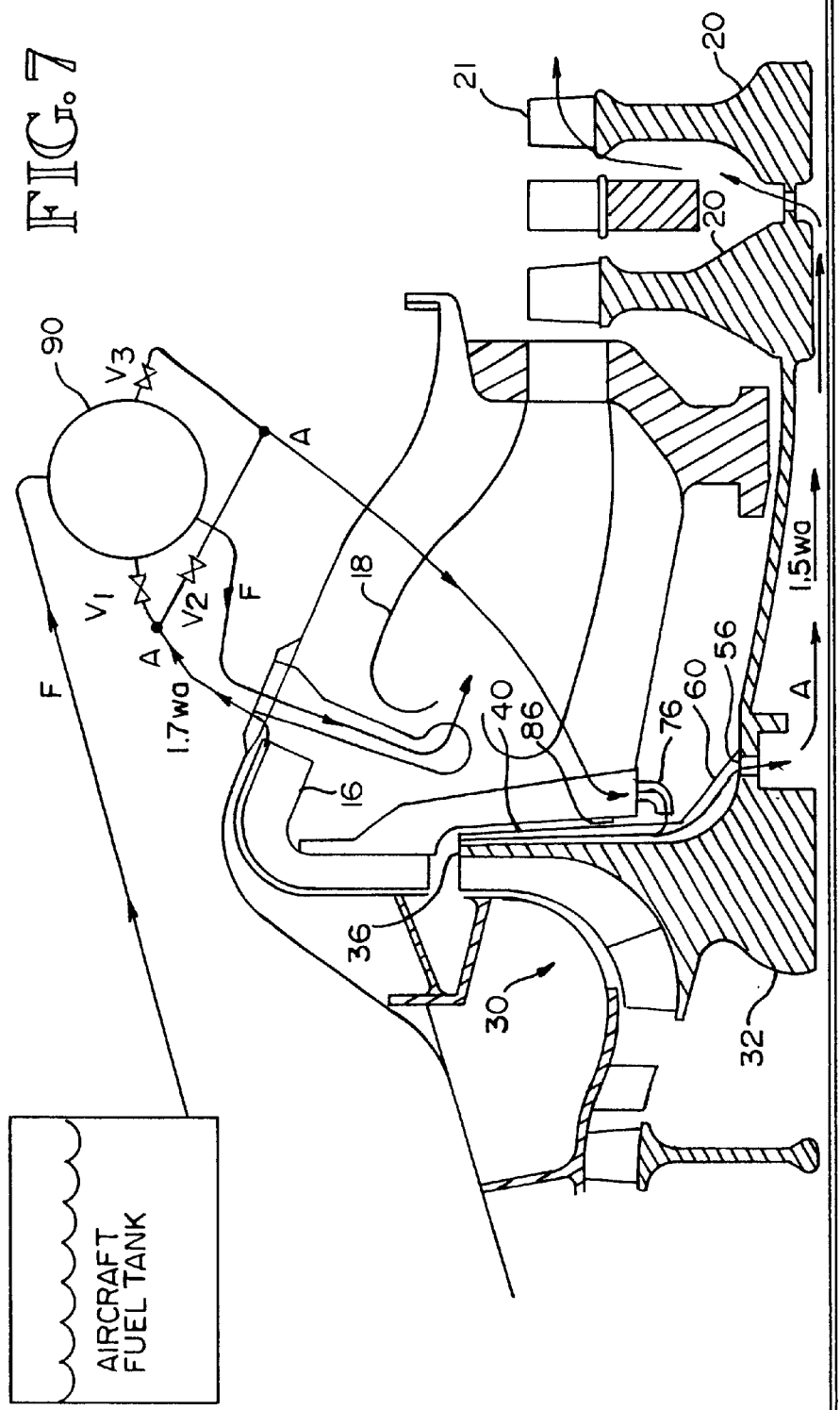
FIG. 7 is a partial, longitudinal cross-sectional view of an axi-circumferential gas turbine engine with the improved impeller of the present invention, illustrating the method of cooling the impeller.

Referring to FIG. 7, cooling of the impeller is accomplished by removing approximately 1.7 percent of the compressor design point air flow (designated 1.7 $W_a$), routing it through a heat exchanger 90, then through the TOBI nozzles 76 where it circulates between the back face of the impeller body 32 and the shield plate 40 as illustrated in FIG. 5, then passes between the plenum ring 60 and impeller body 32, through the teeth of the curvic joint, and then aft as in the prior art FIG. 1 to the high-pressure turbines 20 where it is used to cool the second stage high-pressure turbine blades 21 before being recombined with the main flow through the turbine blades. Approximately 0.2% $W_a$ leaks past the brush seal 86 above the TOBI nozzles, and another 0.05% $W_a$ will leak outward through the joint between the impeller body 32 and the shield plate 40 at the impeller rim 36. This cools this local area and leaves approximately 1.5 $W_a$ available to cool the back face of the impeller, and then the turbines.

The 1.7 $W_a$ cooling air is removed from the main gas stream at the diffuser pipes 16 through semi total pressure scoops to provide the maximum available pressure for the impeller cooling system. Pipes from the scoops are manifolded together, then the air is routed through the heat exchanger. This high-pressure air can accommodate the pressure drop associated with the cooling of the air in the heat exchanger. There is still sufficient pressure to circulate the cooling air along the impeller back face and through the curvic joint at the rear the impeller and then aft to cool the second stage high-pressure turbine blades 21. The cooling system for the impeller is thereby integrated with that for the high-pressure turbines, rather than being a separate add-on system. The flow volume, temperature and pressure of the cooling air exiting from the impeller back face circuit at the curvic joint 56 are sized to be suitable for cooling the second stage high pressure turbine blades, similar to the conditions at the cooling circuit entrance in front of the impeller for the prior art configuration shown in FIG. 1.

This cooling air is piped externally to heat exchanger 90, which may be a conventional cross-flow type wherein the cooling air flows through pipes which are cooled by fuel from the main aircraft fuel tank flowing across them. However, an endothermic type heat exchanger is preferred because it would significantly reduce the heat exchanger weight and bulk. Fuel flow, indicated by the arrows F, is from the aircraft fuel tank, through the heat exchanger then to nozzles at the combustor 18. Cooling air flow, indicated by the arrows A, is from the scoops at diffuser pipes 16, through the heat exchanger 90, and then to TOBI nozzles 76.

When $T_3$ is more than 200° F. below maximum, such as at low-power conditions, valve V1 is closed and valve V2 is open so bleed air bypasses the heat exchanger and its associated pressure drop. This reduces the active air system pressure differential at low-power conditions. When $T_3$ is within 200° F. of maximum, such as at higher power conditions, valve V1 is open and valve V2 is closed so that bleed air flows through the heat exchanger. The functions of V1 and V2 may be performed by a single device or by two or more devices using devices and switching methods known in the art. Valve V1 and a valve V3, which is located in the heat exchanger air exit pipe, are closed if a temperature indicator mounted inside the heat exchanger 90 indicates a temperature above normal operating limits. With all air to the heat exchanger shut off, there can be no combustion inside the heat exchanger. The functions of valve V1 and V3 may also be performed by a single device.

The above described improved impeller for axi-centrifugal gas turbine engines and method of cooling it provides a closed circuit system that integrates with existing systems for cooling the second stage high-pressure turbine blades and has no impact on the engine primary flow streams. All of the impeller cooling system flows are forced-vortex to minimize flow variability and system pressure drops. The system provides for a temperature reduction of approximately 150° F. at the rim of the impeller, which reduces the impeller thermal stress gradients from the front face to the back face and allows the compressor discharge temperature T3 to be increased approximately 150° F., thereby increasing the overall engine efficiency.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims.

What is claimed is:

1. In an axi-centrifugal gas turbine engine having a plurality of axial compressor stages for compressing a main air stream followed by a centrifugal stage and diffuser pipes, the centrifugal stage using an impeller to redirect the air stream, the impeller being connected at its aft end to a turbine shaft and having a plurality of forward-facing blades, a rim, and an aft face having a generally flat portion and a curved portion located radially inward from the flat portion; an improved impeller, comprising:

a curvic coupling joint between the aft end of the impeller and the turbine shaft;

a shield structure connected to the impeller and extending from the turbine shaft near the curvic coupling joint to the impeller rim, the shield structure being generally annular disk shaped and offset from the aft face of the impeller thereby forming a cavity between the shield structure and the aft face of the impeller, the shield structure having a plurality of apertures through which cooling air passes to first circulate through the cavity to cool the impeller, then exit through the curvic coupling joint.

2. The impeller of claim 1, wherein the shield structure has a shield portion generally parallel to the flat portion of the aft face, and a plenum portion extending from the shield portion to the curvic joint; the apertures being located near a juncture of the shield portion and the plenum portion.

3. The impeller of claim 1, wherein the shield structure includes a shield ring extending aftward from the shield structure and located adjacent to and radially outward from the apertures.

4. The impeller of claim 2, wherein the plenum portion is generally parallel to the curved portion of the aft face of the impeller.

5. The impeller of claim 2, wherein the shield structure has radial vanes extending from the shield portion to the flat portion of the aft face of impeller.

6. The impeller of claim 5, wherein the radial vanes are arranged in pairs straddling each aperture, each pair of vanes being joined together at their inner ends by a joining portion to form a U-shape, the joining portion partially surrounding the aperture.

7. The impeller of claim 6, wherein the shield portion has an outer rim with a forward extending rail that connects with a mating portion on the impeller extending aftward near the rim of the impeller, and wherein the radial vanes have outer ends that terminate before the rail to allow cooling air to flow around the ends.

8. The impeller of claim 5, wherein the plenum portion has radial vanes extending forward and inward.

9. The impeller of claim 2, wherein the plenum portion and the shield portion are two pieces having adjacent mating sections that overlap radially, the apertures being located in the mating sections.

10. The impeller of claim 9, wherein the shield portion has an inner rim and a radial piloting ring at the inner rim extending aftward, and wherein the plenum portion has a piloting surface which mates with the radial piloting ring.

11. The impeller of claim 1, wherein the turbine shaft has a piloting ring disposed circumferentially on the turbine shaft and located aft of the curvic coupling, and wherein the shield structure has an inner rim with an aft surface which mates with the piloting ring.

12. The impeller of claim 1, wherein the shield structure has an outer rim portion with a circumferential rail extending forward, and the impeller has a mating ring extending aftward from the aft face near the impeller rim, the circumferential rail and mating ring overlapping to form a joint between the shield structure and the impeller.

13. The impeller of claim 12, wherein the circumferential rail is disposed radially inward from the mating ring, and wherein the circumferential rail has a radial step extending outward around the circumferential rail, and the mating ring has a recess which receives the radial step to axially retain the shield structure to the impeller.

14. The impeller of claim 13 wherein the circumferential rail, the radial step and the mating ring are full hoop structures that have uniform axial cross sections.

15. The impeller of claim 12, wherein the outer rim portion of the shield structure has a circumferential ring located radially outward from the circumferential rail and extending generally radially outward from the shield structure to help shield the mating ring and the impeller rim from heat.

16. The impeller of claim 1, further comprising a system for extracting a portion of the main air stream near an output of the diffuser pipes for use as cooling air, mechanisms for selectively routing the cooling air through a heat exchanger or a bypass of the heat exchanger, and a system for injecting at least a portion of the cooling air from the heat exchanger or from the bypass into the cavity through the apertures in the shield structure for use in cooling the aft face of the impeller.

17. The impeller of claim 16, wherein the mechanisms for selectively routing includes at least one valve.

18. The impeller of claim 17, wherein the at least one valve directs air to the heat exchanger when a temperature of the main air stream discharged from the compressor is within 200 degrees of a maximum limit.

19. The impeller of claim 17, wherein the at least one valve directs air to the bypass when a temperature of the main airstream discharged from the compressor is not within 200 degrees of a maximum limit, or when a temperature indicator in the heat exchanger indicates a temperature above normal operating limits.

20. The impeller of claim 16, wherein the system for injecting includes a plurality of nozzles disposed aft of the shield structure and oriented so as to discharge cooling air through the apertures in the shield structure and into the cavity.

21. The impeller of claim 20, wherein the nozzles are oriented so that cooling air exits them having a velocity component in direction of impeller rotation.

22. The impeller of claim 16, further comprising a brush seal between the shield structure and a stationary structure located aft of the shield structure, the brush seal being located radially outward from the apertures to limit the cooling air flowing radially outward instead of through the apertures, and also to shield the cooling air from inflowing leakage of the main air stream around the impeller rim.

23. In an axi-centrifugal gas turbine engine having a plurality of axial compressor stages for compressing a main air stream followed by a centrifugal stage the centrifugal stage using an impeller to redirect the air stream, the impeller being connected at its aft end to a turbine shaft and having a plurality of forward-facing blades, a rim, and an aft face having a generally flat portion and a curved portion located radially inward from the flat portion, an improved impeller, comprising:

(a) a curvic coupling joint between the aft end of the impeller and the turbine shaft;

(b) a generally annular disk-shaped shield plate with an outer rim and an inner rim, the shield plate being attached near its outer rim to the impeller near its rim, the shield plate being offset from and generally parallel to the flat portion of the aft face of the impeller, thereby forming a cavity therebetween, the shield plate having a plurality of circumferentially spaced apertures near its inner rim and a plurality of radial vanes extending forward from the shield plate to the flat portion of the aft face of the impeller, the radial vanes being arranged in pairs straddling each aperture, each pair of vanes being joined together at their inner ends by a joining portion to form a U-shape, the joining portion partially surrounding the aperture, the radial vanes having outer ends that terminate radially inward from the rim to allow cooling air to flow around the outer ends;

(c) a plenum ring extending from an area near the inner rim of the shield plate to the turbine shaft near the curvic coupling, thereby forming a cavity between the plenum ring and the curved portion of the aft face of the impeller, the plenum ring having an outer portion radially overlapping a portion of the shield plate near the inner rim of the shield plate, the outer portion having apertures aligned with the apertures in the shield plate, the plenum ring having an inner rim with an aft surface which mates with a piloting ring disposed circumferentially on the turbine shaft and located just aft of the curvic coupling, the plenum ring having radial vanes extending forward and inward;

whereby cooling air can be directed through the apertures, into the cavity between the shield plate and the aft face of the impeller, radially outward along the vanes on the shield plate then around the ends of the vanes and radially inward to the cavity between the plenum ring and the aft face of the impeller, then inward through the curvic coupling.

24. A method of cooling an impeller for the main air stream of an axi-centrifugal compressor of a gas turbine engine, comprising the steps of:

extracting a portion of the main air stream as cooling air;

routing the cooling air through a heat exchanger;

injecting at least part of the cooling air into a cavity between an aft face of the impeller and a shield structure attached to the aft face of the impeller; and circulating the cooling air through the cavity to cool the impeller.

25. The method of claim 24, further comprising the step of moving the cooling air from the cavity inward through a curvic coupling joint between the impeller and a turbine shaft.

26. The method of claim 25, further comprising the step of moving the cooling air from the curvic coupling joint aftward along the turbine shaft to a high-pressure turbine where it is used to cool blades of the high-pressure turbine.

27. The method of claim 24, further comprising the steps of:

monitoring the temperature of the main air stream, and routing the cooling air to bypass the heat exchanger when the temperature falls more than 200° F. below a preselected maximum.

28. The method of claim 27, further comprising the steps of:

monitoring the temperature inside the heat exchanger, and shutting off all air flow to the heat exchanger if the temperature exceeds a limit.

\* \* \* \* \*